(12) United States Patent
Zimmer et al.

(10) Patent No.: US 10,894,668 B1
(45) Date of Patent: Jan. 19, 2021

(54) SYSTEMS, APPARATUSES, AND METHODS OF MOUNTING A ROLLER OF A CONVEYOR

(71) Applicant: INTELLIGRATED HEADQUARTERS, LLC, Mason, OH (US)

(72) Inventors: Justin Zimmer, Dayton, OH (US); Jeffrey Vessell, Morrow, OH (US); Anthony J. Turco, Liberty Township, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/544,149

(22) Filed: Aug. 19, 2019

(51) Int. Cl.
*B65G 39/12* (2006.01)
*B65G 13/02* (2006.01)
*B65G 13/11* (2006.01)
*B65G 39/09* (2006.01)

(52) U.S. Cl.
CPC .............. *B65G 39/12* (2013.01); *B65G 13/02* (2013.01); *B65G 13/11* (2013.01); *B65G 39/09* (2013.01)

(58) Field of Classification Search
CPC ........ B65G 39/12; B65G 17/24; B65G 13/02; B65G 13/069; B65G 13/11; B65G 39/09
USPC ......................................................... 198/348
See application file for complete search history.

(56) References Cited

U.S. PATENT DOCUMENTS

| 5,868,238 | A | 2/1999 | Bonnet | |
|---|---|---|---|---|
| 7,422,098 | B2 | 9/2008 | Bonham et al. | |
| 9,212,002 | B2 | 12/2015 | Kliefoth | |
| 10,392,197 | B1 * | 8/2019 | Roozeboom | B65G 39/09 |
| 2006/0249357 | A1 | 11/2006 | Wilmo et al. | |
| 2017/0291771 | A1 * | 10/2017 | Reed | B65G 39/08 |
| 2018/0194567 | A1 * | 7/2018 | Schnitkey | B65G 39/12 |
| 2019/0308818 | A1 * | 10/2019 | McIntire | B65G 21/06 |

FOREIGN PATENT DOCUMENTS

| DE | 102005053629 A1 * | 8/2006 | ............ B65H 18/14 |
|---|---|---|---|
| DE | 102006048251 A1 | 4/2008 | |

* cited by examiner

*Primary Examiner* — Gene O Crawford
*Assistant Examiner* — Lester Rushin, III
(74) *Attorney, Agent, or Firm* — Alston & Bird LLP

(57) ABSTRACT

A conveyor is described. The conveyor includes: a conveyor frame having a sidewall and a roller. In some examples, the roller can be mounted on the conveyor frame so that a first portion of the roller extends beyond the sidewall of the conveyor frame. In this regard, the first portion of the roller is the portion that includes a bearing assembly of the roller and the sidewall is that portion of the conveyor frame that guards a conveying surface of the conveyor. The conveyor also includes a strip belt-mounted over a second portion of the roller. The second portion is a portion of the roller that is defined adjacent to the first portion. In some examples, the strip belt is mounted over the roller so that the strip belt is positioned adjacent to the sidewall on the conveyor.

20 Claims, 6 Drawing Sheets

SYSTEMS, APPARATUSES, AND METHODS OF MOUNTING A ROLLER OF A CONVEYOR

TECHNOLOGICAL FIELD

Example embodiments described herein relate generally to systems, apparatuses, and methods of mounting a roller on a conveyor frame of a conveyor, and, more particularly, to mounting the roller on the conveyor frame so that a portion of the roller extends beyond a sidewall of the conveyor frame.

BACKGROUND

In material handling systems, it is known to utilize a conveyor to transport a succession of items along a desired path, or to merge or combine a plurality of conveying paths to fewer paths, or to selectively direct items to respective desired or selected locations or desired paths. For example, using sortation conveyors, items (e.g. parcels, packages, envelops, paper bags, cartons, products, articles, boxes, totes, containers, and/or the like) may be selectively conveyed from the sortation conveyor onto another conveyor or to a desired intermediate or ultimate location by manipulators (e.g. pushers, arms, pop up wheels, cross belts, tilt trays or other suitable structures). Many different configurations are typically known for a conveying surface of a conveyor, such as an endless conveying belt, moving slats or tubes, cross belts, tilt trays, roller bed, and/or the like. For instance, a roller bed configuration of the conveying surface can include multiple rollers mounted between two side rails of a conveyor frame that guards a conveying surface of the conveyor. In some examples, the roller bed can include elongated cylindrical rollers that can be self-driven, such as by a motorized drive roller, or driven by an underlying endless belt urged into contact with the rollers. Typically, the rollers are designed to support conveyor belts or strip belts (for example, but not limited to, narrow band, flat band, and/or the like) for tracking movement of items on the conveying surface.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a conveyor. The conveyor can comprise a conveyor frame that can comprise a sidewall. Further, the conveyor can comprise a roller that can be mounted on the conveyor frame. In some examples, the roller can be mounted on the conveyor frame so that a first portion of the roller extends beyond the sidewall of the conveyor frame. In some examples, the first portion of the roller can comprise a bearing assembly. In some examples, the sidewall of the conveyor frame can correspond to a portion of the conveyor frame that can guard a conveying surface of the conveyor. The conveyor further can comprise, a strip belt that can be mounted over a second portion of the roller. In this regard, in some examples, the second portion of the roller can be defined adjacent to the first portion of the roller. Further, in accordance with some example embodiments, the strip belt can be positioned adjacent to the sidewall on the conveyor.

According to some example embodiments, the conveyor frame of the conveyor can comprise an engagement member that can define an aperture. The engagement member can be configured to position the roller within the aperture.

In some example embodiments, the conveyor frame can further comprise a side plate. The side plate can be positioned at a defined spacing relative to the engagement member. Further, in accordance with some example embodiments, the first portion of the roller can be positioned between the engagement member and the side plate.

In some example embodiments, the conveyor can comprise a plurality of rollers that can be mounted on the conveyor frame. In this regard, an end of the roller can be mounted on a side plate of the conveyor frame and respective ends of remaining rollers of the plurality of rollers can be mounted on the sidewall of the conveyor frame.

In some example embodiments, the strip belt can be mounted over the roller so that the strip belt is positioned proximal to the sidewall of the conveyor and distal to the side plate of the conveyor.

In some example embodiments, the strip belt can correspond to one of an O-ring, a flat band, and a narrow band.

According to some example embodiments, the crowned portion of the roller can be a portion of the roller that can be defined circumferentially around an axis of the roller with an increased diameter relative to a diameter of an uncrowned portion of the roller. In this regard, the crowned portion of the roller can comprise a groove to support an O-ring and the strip belt over the O-ring.

Some example embodiments described herein relate to a conveyor comprising a conveyor frame. The conveyor frame can comprise, a first sidewall, a second sidewall, and a side plate that guards a conveying surface of the conveyor. The conveyor can further comprise, a roller bed defined by a plurality of rollers. The plurality of rollers can comprise, a roller that can comprise a first portion and a second portion. In this regard, the first portion of the roller can be defined along a length of the roller and can comprise a bearing assembly. The second portion of the roller can be defined adjacent to the first portion along the length of the roller. In some example embodiments, the roller can be mounted on the conveyor frame between the first sidewall and the side plate so that the second sidewall is positioned between the first portion and the second portion of the roller.

According to some example embodiments, the conveyor frame can comprise an engagement member. The engagement member can comprise an aperture and can be configured to support a positioning of the roller within the aperture.

According to some example embodiments, the first portion of the roller can be mounted on the conveyor frame so that the first portion extends beyond the second sidewall of the conveyor frame. Further, the first portion of the roller can be positioned between the engagement member and the side plate of the conveyor. In some example embodiments, the first portion of the roller can comprise a bearing assembly that can be configured to support rotation of the roller about an axis of the roller.

In some example embodiments, the conveyor can comprise a strip belt-mounted over the second portion of the roller and positioned adjacent to a second sidewall that guards the conveying surface of the conveyor.

In some example embodiments, the strip belt can be mounted over the second portion of the roller so that the strip belt is positioned proximal to the second sidewall of the conveyor frame and distal to the side plate of the conveyor frame.

In some example embodiments, the strip belt is at least one of an O-ring, a flat bands, and a narrow band.

In some example embodiments, the second portion of the roller can correspond to a crowned portion comprising an increased diameter relative to a diameter of an uncrowned portion of the roller. In this regard, the strip belt can be mounted over the crowned portion of the roller.

According to some example embodiments, the roller can correspond to a set of rollers of a divert unit of the conveyor that can be configured to divert an item from the conveyor to a divert section coupled to the divert unit of the conveyor.

According to some example embodiments, a method for mounting a roller of a conveyor is described. The method can comprise positioning, on an engagement member, a roller comprising a first portion and a second portion defined along a length of the roller. In this regard, the first portion of the roller can comprise a bearing assembly that supports rotation of the roller. Further, the method can comprise, mounting the roller on the conveyor frame so that a sidewall that guards a conveying surface of the conveyor can be positioned between the first portion and the second portion of the roller.

According to some example embodiments, the method can comprise, engaging a first end of the roller to a first sidewall of the conveyor frame. Further, the method can comprise, engaging a second end of the roller to a side plate of the conveyor frame. In this regard, the first sidewall and the sidewall of the conveyor frame can guard the conveying surface of the conveyor.

In some example embodiments, the method can further comprise, mounting a strip belt over the second portion of the roller so that the strip belt can be positioned adjacent to the sidewall of the conveyor.

According to some example embodiments, the strip belt is at one of an O-ring, a flat bands, and a narrow band.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
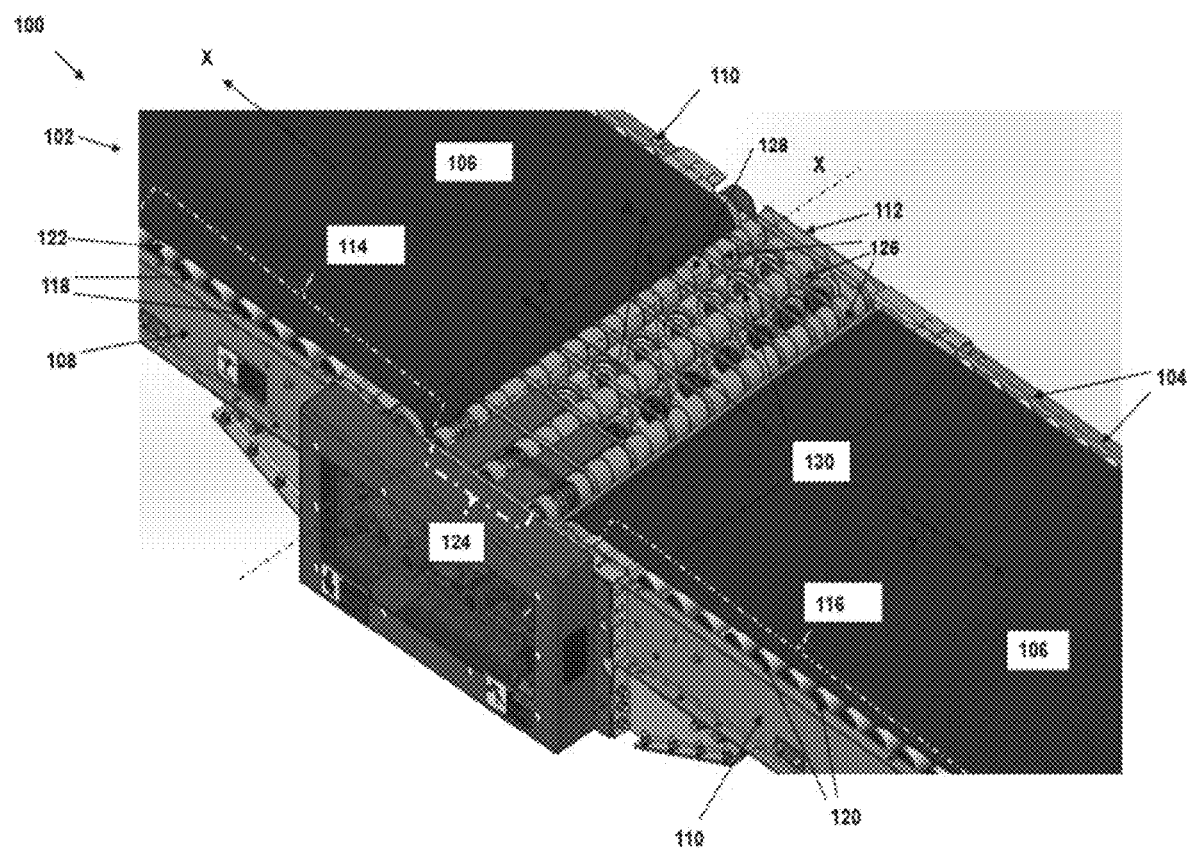
FIG. 1 illustrates a perspective view of a conveyor comprising a roller mounted on a conveyor frame, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Generally, in material handling environments having conveyors, item tracking belts such as, but not limited to, strip belts, flat bands, O-bands, narrow belts, and/or the like, are often used for tracking movement of items on a conveyor bed of the conveyor. These item tracking belts are usually mounted around a set of rollers of the conveyor bed (e.g. roller bed) of the conveyor. The set of rollers are mounted between two sidewalls of a conveyor frame that guards a conveying surface of the conveyor. In other words, to mount a roller on the conveyor frame, a primal end of a roller is engaged on a first sidewall of the conveyor frame and a distal end of the roller is engaged on a second sidewall of the conveyor frame. Typically, these item tracking belts are mounted over the set of rollers at defined positions. Further, the item tracking belts are configured so as to maintain a desired tension throughout the set of rollers. To this end, a desired spacing is maintained amongst item tracking belts mounted over the set of rollers to track a movement of items of varying dimensions over the item tracking belts. However, in some situations, tracking movement of an item of a smaller dimension becomes challenging when the item is to move over an item tracking belt that is positioned towards an extreme end of the set of rollers. More particularly, tracking the movement of the item on a belt-mounted over a last roller or end roller of the set of rollers is challenging due to an existing gap between the item tracking belt and the sidewall of the conveyor frame.

Various example embodiments described herein relate to systems, apparatuses, and methods for mounting a roller of a conveyor on a conveyor frame. The roller can be mounted on the conveyor frame in such a way that an item tracking belt-mounted over the roller can effectively track the movement of items, including items of smaller dimensions (e.g., but not limited to, 4*6-inch size packages). According to some example embodiments, a conveyor is described. The conveyor can comprise a conveyor frame with two sidewalls and a conveying surface (e.g. a roller bed) defined between the two sidewalls. The two sidewalls (also known as side rails) of the conveyor frame are configured to guard the conveying surface of the conveyor. In accordance with some example embodiments, a roller can be mounted on the conveyor frame of the conveyor in such a way that a first portion of the roller extends beyond a sidewall (for example, any one side rail of the conveyor frame that guards a conveying surface of the conveyor). In this regard, the first portion of the roller can correspond to a portion of the roller that can comprise a bearing assembly. In some examples, rollers of the conveyors can have a respective bearing assembly (including bearings) defined towards ends of the rollers. The bearing assembly referred herein, typically, supports rotation of the respective roller about an axis of the roller. Thus, according to some examples, the first portion of the roller that extends beyond the sidewall is that portion of the roller which includes the bearing assembly of the roller. Further, in accordance with some example embodiments, the conveyor can comprise a strip belt that can be mounted on a second portion of the roller. The second portion of the roller corresponds to a portion of the roller that is adjacent to the first portion of the roller along a length of the roller. The strip belt supports tracking movement of an item on the strip belt.

Further, in accordance with various example embodiments described herein, the roller can be mounted on the conveyor frame so that the sidewall of the conveyor frame that guards the conveying surface of the conveyor can be positioned between the first portion and the second portion of the roller. Said differently, in some example embodiments, the roller can be mounted on the conveyor frame so that (i) a first end of the roller is engaged with a first sidewall of the conveyor frame, (ii) a second end of the roller including the first portion extends beyond a second sidewall of the conveyor frame, and (iii) the second end of the roller is engaged to a side plate of the conveyor frame. While, as described before, the first sidewall and the second sidewall corresponds to conveyor frame rails that guards the conveying surface of the conveyor, the side plate of the conveyor frame is a portion of the conveyor frame positioned at a defined spacing relative to the second sidewall. Further, in some example embodiments, as the strip belt can be mounted over the second portion of the roller, the strip belt can be positioned closer (or in some examples almost adjacent) to the sidewall (i.e. the second sidewall) of the conveyor, thereby avoiding, any gap formation between the strip belt and the sidewall. Placement of the item tracking belt closer to the sidewall prevents losing track of smaller sized item by the item tracking belt. Further details related to the mounting of the roller are described hereinafter in reference with FIGS. 1-6.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

FIG. 1 illustrates a perspective view 100 of a conveyor 102 of a material handling environment. The conveyor 102 comprises a conveyor frame 104 and a conveying surface 106 (e.g., but not limited to, a roller bed) for conveying items. In various example embodiments described herein, the conveyor 102 can correspond to, a conveyor of a sorter system such as, but not limited to, a strip belt sorter, a narrow belt sorter, and/or the like. In some example embodiments, the conveyor frame 104 of the conveyor 102 can comprise, a first sidewall 108, a second sidewall 110, and a side plate 112. In some examples, the conveying surface 106 of the conveyor 102 can be defined by a roller bed. The roller bed can comprise a plurality of rollers and an item conveying belt-mounted over the plurality of rollers. Illustratively, in some example embodiments, a first portion 114 and a second portion 116 of the conveying surface 106 can be defined by a first set of rollers 118 and a second set of rollers 120 respectively. The first set of rollers 118 and the second set of rollers 120 can be mounted between the first sidewall 108 and the second sidewall 110 of the conveyor frame 104. Further, in some example embodiments, a conveyor belt 122 can be mounted over the first set of rollers 118 and the second set of rollers 120, respectively. Further, in some example embodiments, a third portion 124 of the conveying surface 106 can be defined by a third set of rollers 126. Illustratively, the third set of rollers 126 can be mounted between the first sidewall 108 and the side plate 112 of the conveyor frame 104. In accordance with some example embodiments described herein, the first sidewall 108 and the second sidewall 110 of the conveyor frame 104 corresponds to portion of the conveyor frame that guards the conveying surface 106 of the conveyor 102.

Further, according to various example embodiments described herein, the third set of rollers 126 can comprise at least a roller 128 that can be mounted on the conveyor frame 104 such that a first portion of the roller 128 extends beyond the second sidewall 110 of the conveyor frame 104. In this regard, the first portion of the roller 128 can correspond to a portion of the roller 128 that can comprise a bearing assembly (not shown). The bearing assembly of the roller 128 can be configured to support rotation of the roller about its axis X. Further details of mounting of the roller 128 that extends beyond the second sidewall 110 of the conveyor frame 104 are described in reference to FIGS. 2-6.

In some example embodiments, the first set of rollers 118 and the second set of rollers 120 can comprise multiple rollers that can be rotated to cause movement of the conveyor belt 122 mounted over the respective rollers. Said differently, the conveyor belt 122 can be configured to move around the first set of rollers 118 and the second set of rollers 120 respectively, based on the rotation of respective rollers. According to some example embodiments, the conveyor 102 can correspond to a belt conveyor comprising the conveyor belt 122 that can be driven by an external motor/reducer and a pulley arrangement, that can move the conveyor belt 122. Further, movement of the conveyor belt 122 causes movement of an item positioned over the conveyor belt 122 in an upstream direction X or downstream direction Y of conveyance depending on the direction of movement of the conveyor belt 122. According to some example embodiments, the movement of the conveyor belt 122 can be controlled by motor controllers (not shown) which can communicate with a programmable controller (not shown) of the conveyor 102. In some examples, the programmable controller (PC) may correspond to an industrial PC that can communicate with the motor to move the conveyor belt 122.

Illustratively, the third portion 124 of the conveying surface 106 can correspond to a divert unit that can be configured for diverting items. The divert unit can comprise a plurality of pop-wheels 130 that can be positioned beneath the third set of rollers 126 in a section of the divert unit. The plurality of pop-up wheels 130 may be configured to actuate and in response to actuation, cause diverting of the item from the conveyor 102 to the divert section.

In some example embodiments, a plurality of item tracking belts 132 (e.g. flat bands) may be mounted around the third set of the rollers 126 for tracking movement of items on the respective belts. In some examples, the plurality of item tracking belts 132 can be mounted over an apex portion of a crown defined on each roller of the third set of rollers 126. In this regard, each item tracking belt of the plurality of item tracking belts 132 may be spaced apart at a defined spacing relative to other item tracking belt over the third set of the rollers 126. Said differently, in accordance with some example embodiments, the plurality of item tracking belts 132 can be spaced apart at defined spacings amongst each other, over the rollers to support tracking movement of items of varying dimensions over the item tracking belts 132.

In accordance with some example embodiments described herein, an item tracking belt 134 of the plurality of item tracking belts 132 can be mounted over a second portion (not shown) of the roller 128 that is adjacent to the first portion of the roller 128. To that end, as described before, the roller 128 can be mounted on the conveyor frame 104 so that the first portion of the roller 128 extends beyond the second sidewall 110 of the conveyor frame 104. Said differently, the roller 128 can be mounted on the conveyor frame 104 so that the second portion and the first portion of the roller are positioned on opposite sides relative to the second sidewall 110, i.e. the sidewall 110 is positioned between the second portion and the first portion of the roller 128. As the item tracking belt 134 is mounted over the second portion of the roller 128, the item tracking belt 134 can be positioned closer or adjacent to the second sidewall 110 of the conveyor frame 104. In this regard, in some examples, the item tracking belt 134 can be positioned adjacent to the second sidewall 110 and can support tracking movement of items having smaller dimensions on the conveyor 102.

In some example embodiments, in an item conveying operation, items of varying dimensions on the conveyor belt 102 and may move in the upstream direction X from an end of the conveyor 102 to the divert unit. For instance, in an example embodiment, a first item of a first dimension (for example, a smaller package) may move onto the item tracking belt 134 that is positioned closer to the second sidewall 110 and a second item of a second dimension (for example, a larger package) can move onto any of the remaining item tracking belts of the plurality of item tracking belts 134. In this regard, the conveyor 102 can comprise manipulators such as robotic arms or gripper devices, and/or the like, that can be configured to position the items on the conveyor 102 at desired positions on the conveying surface 106 in such a manner, that an item of a first dimension can be received over the item tracking belt 134 and the second item can be received over any of the remaining item tracking belts.

Figure 2:
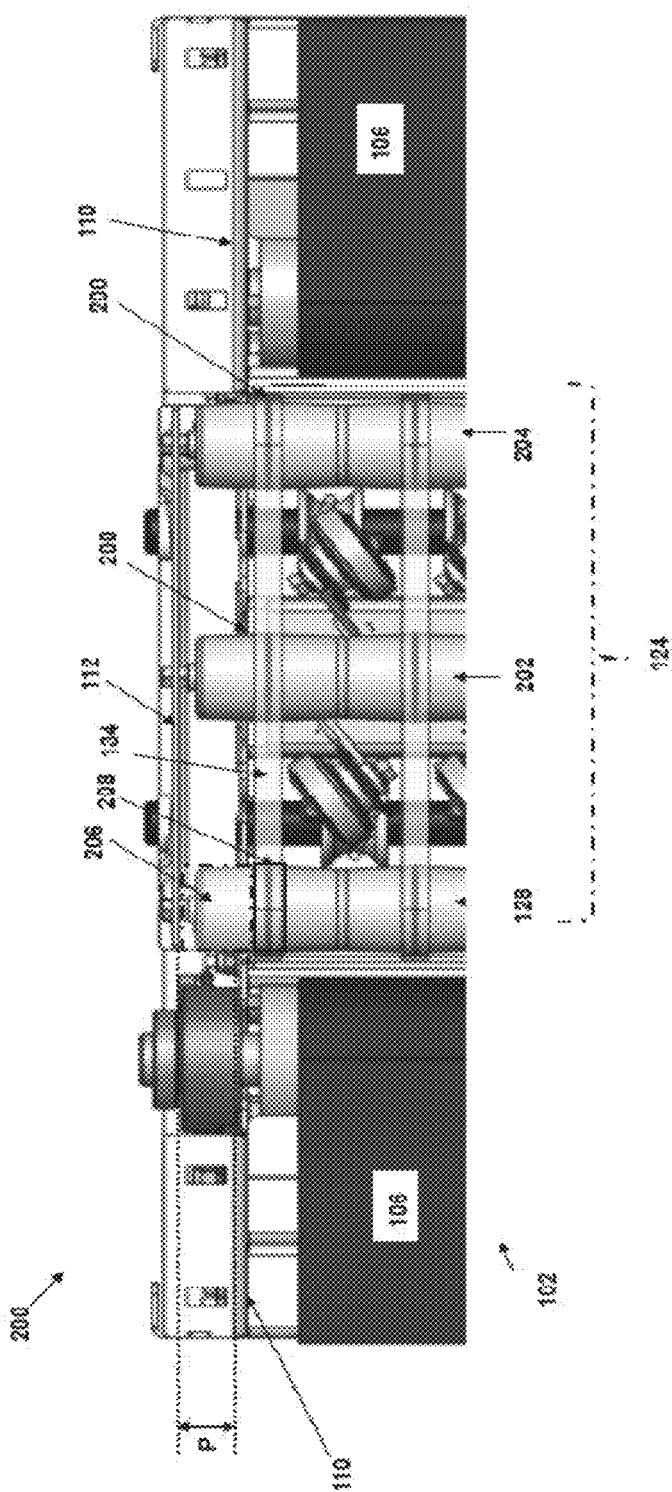
FIG. 2 schematically depicts a top view of a section of the conveyor comprising the roller, in accordance with some example embodiments described herein.

FIG. 2 schematically depicts a top view 200 of a section of the conveyor 102 comprising the roller 128, in accordance with some example embodiments described herein. Illustratively, a section of the conveyor 102 comprises rollers mounted on the conveyor frame so that a sidewall (e.g. the second sidewall 110) of the conveyor frame 104 is positioned between a first portion and a second portion of the rollers. For instance, the top view 200 illustrates the third portion 124 of the conveyor surface 106, as described in FIG. 1. Illustratively, the third portion 124 comprises the roller 128 and rollers 202 and 204, respectively. The rollers 128, 202, and 204 corresponds to the third set of rollers 126, as described in FIG. 1. According to some example embodiments, the roller 128 can be mounted on the conveyor frame 104 so that a portion, for example, a first portion 206 of the roller 128 can extend beyond the second sidewall 110 of the conveyor frame 104. The top view 200 illustrates, that the first portion 206 of the roller 128 is extended beyond a distance P units (e.g. P cm) from the second sidewall 110 of the conveyor frame 104. Said differently, the first portion 206 of the roller 128 is positioned between the second sidewall 110 and the side plate 112 that are spaced apart at the distance P units. In some example embodiments, the first portion 206 of the roller 128 (i.e. the portion extended beyond the second sidewall 110) can correspond to that portion of the roller 128 that comprises a bearing assembly (not shown). The bearing assembly of the roller 128 can comprise multiple ball bearings that supports rotation of the roller 128 about the axis X of the roller 128. Further, in accordance with some example embodiments, the second sidewall 110 corresponds to that portion of the conveyor frame that guards the conveying surface 106 of the conveyor 102 between the second sidewall 110 and the first sidewall 108, as illustrated in FIG. 1.

Further, in accordance with some example embodiments, a strip belt (e.g. the item tracking belt 134) can be mounted over a second portion 208 of the roller 128. As illustrated, the second portion 208 of the roller 128 is defined adjacent to the first portion 206 on the roller 128. Also, as the item tracking belt 134 is mounted over the second portion 208 of the roller 128, the item tracking belt 134 can be positioned adjacent to the second sidewall 110 of the conveyor 102. Said differently, the item tracking belt 134 can be mounted over the roller 128 so that the item tracking belt 134 can be positioned proximal to the second sidewall 110 of the conveyor 102 and distal to the side plate 112 of the conveyor 102. Illustratively, in some example embodiments, the conveyor 102 also comprises the rollers 202 and 204 that can be mounted on the conveyor frame 104 in a similar manner as described for the roller 128, i.e. a portion of the respective rollers 202 and 204 extending beyond the second sidewall 110 and the item tracking belt 134 positioned over an adjacent portion of the roller.

Figure 3:
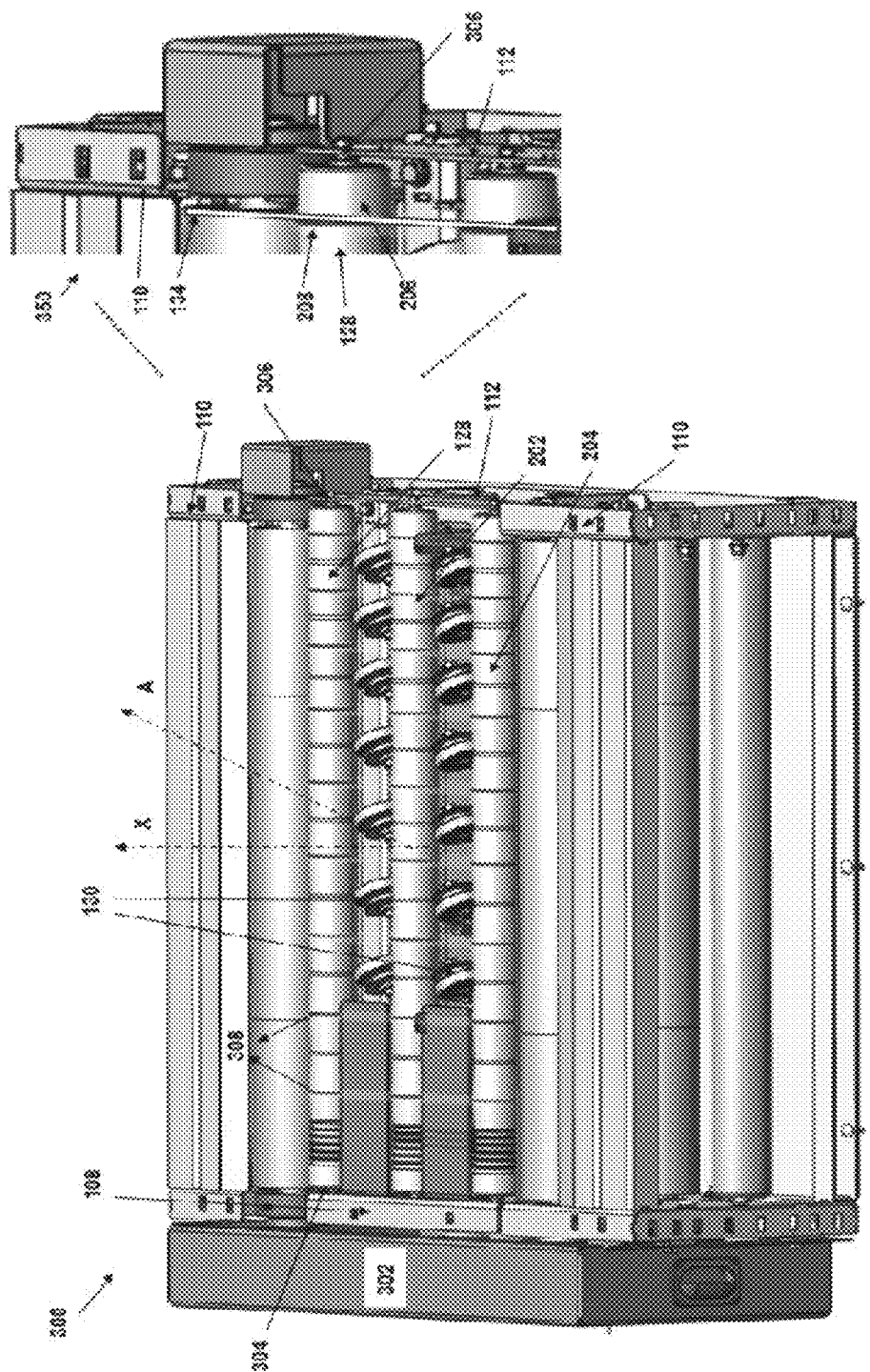
FIG. 3 illustrates a perspective view of a divert unit of the conveyor comprising the roller and an enlarged view of a section of the divert unit of the conveyor, in accordance with some example embodiments described herein.

FIG. 3 illustrates a perspective view 300 of a divert unit 302 of the conveyor 102 comprising the roller 128, in accordance with some example embodiments described herein. As described before, the divert unit 302 can be configured to divert an item to a divert lane from the conveying surface 106 of the conveyor 102. The divert lane can be conveyor section coupled to the conveyor 102. As described in FIG. 2, FIG. 3 also illustrates, the third set of rollers 126 of the divert unit 302 including the rollers 128, 202, and 204 respectively. According to some example embodiments, the roller 128 can comprise a body defined between a first end 304 and a second end 306. In some examples, the first end 304 and the second end 306 of the roller 128 can correspond to axles of the roller 128. In some example embodiments, the body of the roller can comprise a plurality of crowns 308 defined along a length of the roller 128 between the first end 304 and the second end 306. However, in some alternate example embodiments, the conveyor 102 can other shapes and profiles of rollers (mounted between the first sidewall 108 and the side plate 112 of the conveyor frame 104) over which any type of conveying bands, e.g., but not limited to, o-band, flat bands, narrow bands, can be mounted. In an example embodiment, the roller 128 can be mounted on the conveyor frame 104 so that, a first end 304 of the roller 128 can be mounted on the first sidewall 108 and the second end 306 of the roller can be mounted on the side plate 112 of the conveyor frame 104. In this regard, referring to enlarged view 350 of a section of the divert unit 302, the roller 128 can be mounted on the conveyor frame 104 so that the first portion 206 of the roller extends beyond the second sidewall 110 of the conveyor frame 104. Said differently, the roller 128 is mounted on the conveyor frame 104 so that the second sidewall 110 is positioned between the first portion 206 and the second portion 208 of the roller 128. Further, the item tracking belt 134 can be mounted over the second portion 208 of the roller 128 so that the item tracking belt 134 is positioned adjacent or proximal to the second sidewall 110 and distal to the side plate 112 of the conveyor frame 104.

Illustratively, in some examples, the divert unit 302 can comprise a plurality of pop-wheels 130 that can be positioned beneath the third set of rollers 126 in a section of the divert unit 302. In this regard, in some example embodiments, the pop-up wheels 130 can be configured to be moved from a first position to a second position in a direction substantially perpendicular to the conveying surface 106 to cause the diverting of the item. For instance, a pop-up wheel of the plurality of pop-up wheels 130 can be: (a) raised up from the first position to the second position and rotated about an axis to cause diverting of the item, and subsequently can be (b) lowered down to reach back the first position. In accordance with some example embodiments, the pop-up wheels 130 can comprise wheels that can be configured to rotate about its axis, in response to reaching the raised-up position, to cause deflection of the item incoming on the divert unit of the conveyor 102, in a desired direction, for example direction A, as illustrated in FIG. 1, towards the divert lane (not shown). In some examples, the divert section or the divert lane can be mechanically connected to a side of the conveyor 102.

Figure 4:
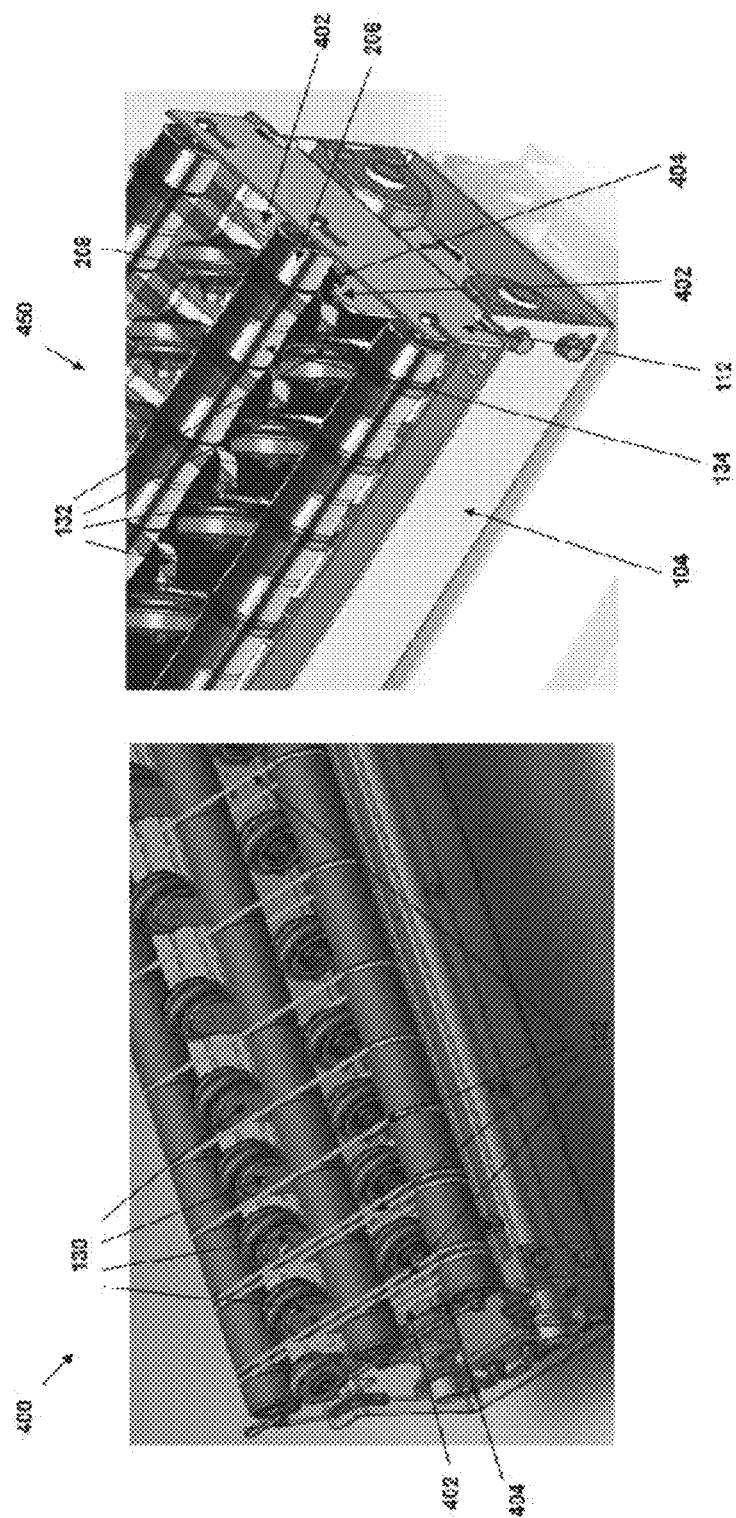
FIG. 4 illustrates a perspective view the roller positioned over an engagement member of the conveyor frame and another perspective view of the roller positioned over the engagement member and mounted on a side plate of the conveyor frame of the conveyor, in accordance with some example embodiments described herein.

FIG. 4 illustrates a perspective view 400 the roller 128 positioned over an engagement member of the conveyor frame 104 and another perspective view 450 of the roller 128 positioned over the engagement member and mounted on the side plate 112 of the conveyor frame 104 of the conveyor 102, in accordance with some example embodiments described herein. In accordance with some example embodiments, the conveyor frame 104 further can comprise an engagement member 402. The engagement member 402 can be of a shape defining an aperture 404. In accordance with some example embodiments, the engagement member 402 can be configured to support positioning of the roller 128 within the aperture 404 defined on the engagement member 402. In some examples, the engagement member 402 can be a portion of the conveyor frame 104 or a metal plate comprising an inverted U shape that defines the aperture 404 within which the roller 128 can be positioned. In some example embodiments, the roller 128 can be positioned within the aperture 404 of the engagement member 402 in such a manner so that the first portion 206 of the roller 128 can be positioned between the engagement member 402 and the side plate 112. In this regard, the roller 128 can be mounted between the first sidewall 108 and the side plate 112 of the conveyor frame 104 such that the second end 306 of the roller 128 can be engaged with the side plate 112 of the conveyor frame 104. Illustratively, the plurality of item tracking belts 132 can be positioned over the roller 128 at defined positions. In some examples, the item tracking belts 132 can be one of, an O ring, a flat band, and a narrow band.

Figure 5:
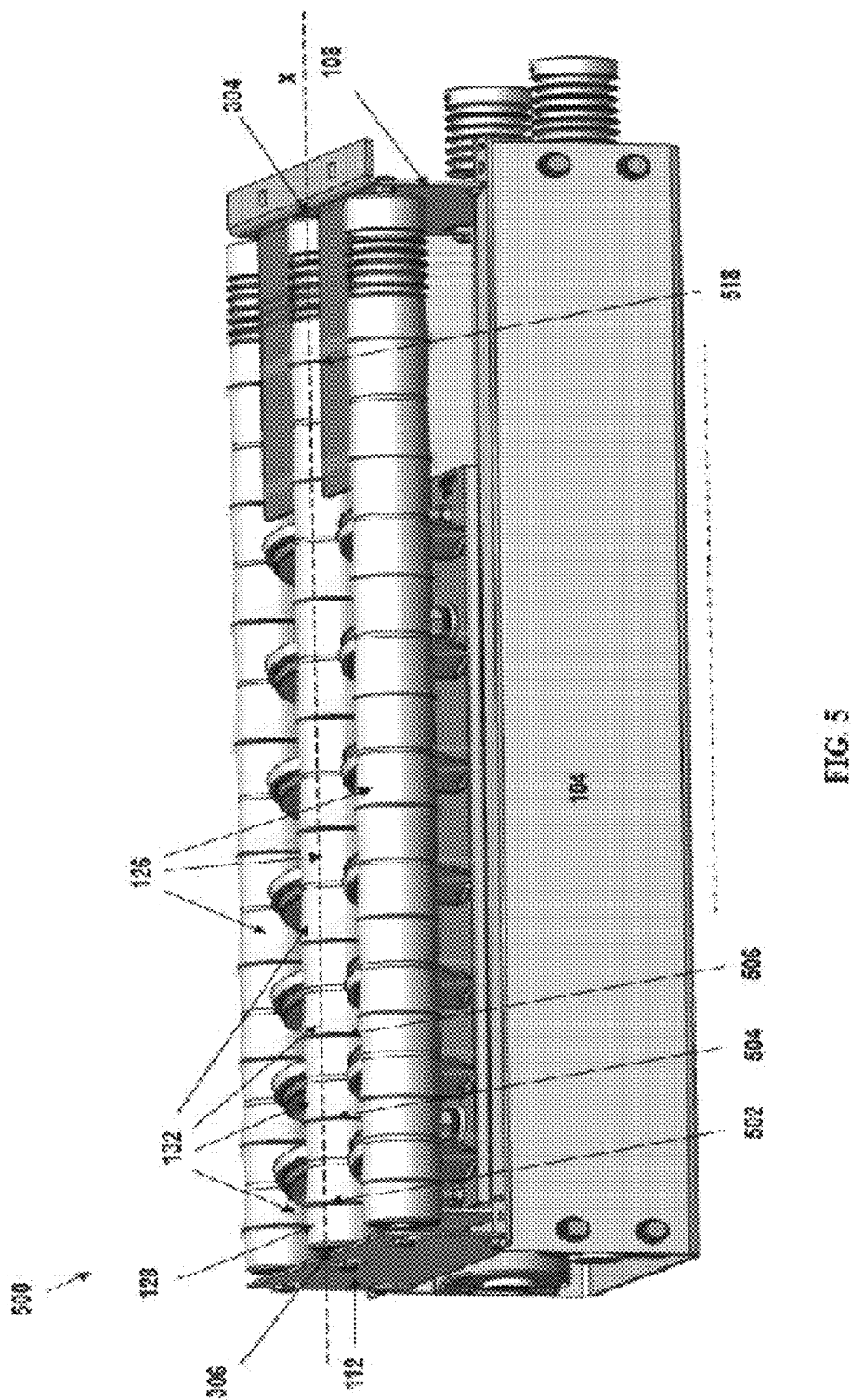
FIG. 5 illustrates a side perspective view of a set of rollers comprising the roller mounted between a first sidewall of the conveyor frame and the side plate of the conveyor frame, in accordance with some example embodiments described herein.

FIG. 5 illustrates a side perspective view 500 of a set of rollers (e.g. the third set of rollers 126 as described in FIG. 1) comprising the roller 128 mounted between the first sidewall 108 of the conveyor frame 104 and the side plate 112 of the conveyor frame, in accordance with some example embodiments described herein. As illustrated, the roller 128 can be mounted on the conveyor frame 104 so that the first end 304 of the roller 128 can be engaged to the first sidewall 108 and the second end 306 of the roller 128 can be engaged to the side plate 112 of the conveyor frame 104. In this regard, the first end 304 and the second end 306 can correspond to axles that may be protruding out from the roller 128 and can be mounted on slots of complimentary shape defined on surface of the first sidewall 108 and the side plate 112 respectively.

In some examples, the roller 128 referred herein, can correspond to a roller of the third set of rollers 126 of the divert unit 302 (as described in FIG. 3) of the conveyor 102 that can be configured for diverting items from the conveyor to a divert lane. In some alternate example embodiments, the roller 128 can also correspond to a roller from amongst the first set of rollers 118 and/or the second set of rollers 120 (as described in FIG. 1) of the conveyor 102 in a material handling system.

Illustratively, in some example embodiments, the roller 128 can comprise, the first end 304, the second end 306, and a plurality of crowns 502-518 that can be defined along a length of the roller 128 between the first end 304 and the second end 306 of the roller 128. The crowns 502-518 may correspond to raised portion of the roller 128 comprising an increased diameter relative to remaining uncrowned portions of the roller 128. In this regard, each crown of the crowns 502-518 of the roller 128 can comprise an apex portion that can be defined circumferentially around an axis X of the roller 128. In accordance with some example embodiments, the apex portions of the respective crowns 502-518 can correspond to a portion of the roller 128 with an increased (or almost a maximum) relative to diameter of an uncrowned portion of the roller 128. Further, in accordance with some example embodiments, each crown of the crowns 502-518 of the roller 128 can comprise a groove that can be formed in the apex portion of the respective crown 502-518. The groove on the respective crown 502-518 can be configured to support mounting of an O-ring around the roller 128 within the groove.

In accordance with some example embodiments described herein, the plurality of item tracking belts 132 can be positioned over the O-ring in the groove of the respective crowns 502-518. Positioning the plurality of item tracking belts 132 over the crowns 502-518 and in contact with a respective O-ring facilitates in: (a) self-correction of an item tracking belt (i.e. ensuring that the item tracking belts 132 are moved back to a defined positioned e.g. at an apex of the crown, in a case, when during an operation, the item tracking belt is knocked off from the defined position and (b) additional grip and fine tuning of tracking items that can move on the respective item tracking belts 132 due to support provided by the O-rings. Further, as the item tracking belt 134 is mounted on the rollers 128, 202, 204 in a manner that the item tracking belt 134 is positioned closer to the second sidewall 110, movement of items (including that of smaller dimensions also) can be effectively tracked over the item tracking belt 134.

Figure 6:
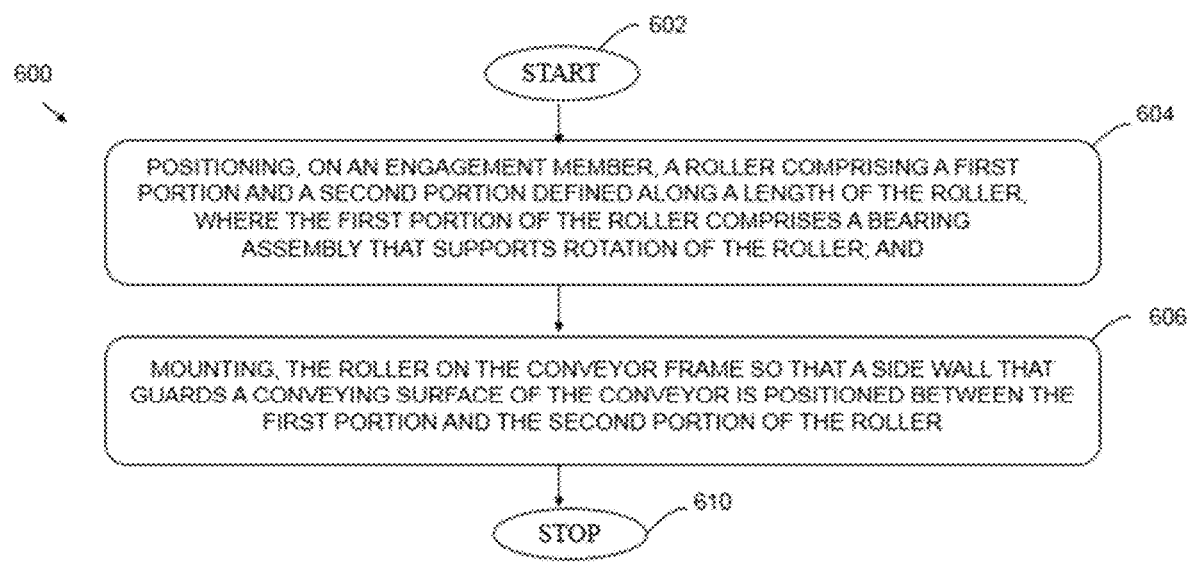
FIG. 6 illustrates a flowchart representing steps of a method of mounting a roller on the conveyor frame of the conveyor, in accordance with some example embodiments described herein.

FIG. 6 illustrates a flowchart representing steps of a method 600 of mounting the roller 128 on the conveyor frame 104 of the conveyor 102, in accordance with some example embodiments described herein. The method 600 described herein in accordance with some example embodiments, can correspond to a method of configuring the conveyor 102 and mounting the roller 128 on the conveyor frame 104 in a manner as described in reference to FIGS. 1-5.

The method starts at step 602. At step 604, the conveyor 102 can comprise means such as, the roller 128 that can be positioned on the engagement member 402 (as described in FIG. 4) of the conveyor frame 104. In this regard, in some examples, the roller 128 can comprise the first portion 206 that can comprise a bearing assembly that supports rotation of the roller 128. In some examples, positioning the roller 128 can include placing the roller 128 within a respective aperture (e.g. the aperture 404) of the engagement member 402.

Moving to step 604, the roller 128 can be mounted on the conveyor frame 104 so that the second sidewall 110 of the conveyor frame is positioned between the first portion 206 and the second portion 208 of the roller 128. In this regard, as described earlier, the second sidewall 110 is the portion of the conveyor frame 104 that guards the conveying surface 106 of the conveyor 102. The method ends at step 606. According to some examples, the roller 128 can be mounted between the first sidewall 108 and the second sidewall 110 of the conveyor frame 104. According to some examples, the roller 128 at its two ends (i.e. the first end 304 and the second end 306) can comprise axles that can be engaged into pre-defined slots of a complementary shape on the first sidewall 108 and the second sidewall 110 of the conveyor frame 104, respectively. In some examples, the two ends of the roller 128 can be mounted on the conveyor frame 104 based on the engagement of the two ends of the roller 128 using the engagement assembly at respective ends, for example, by using a nut and bolt assembly on the sidewalls.

According to some examples, multiple rollers (e.g. the rollers 128, 202, and 204) can be positioned on the conveyor frame 104 in a similar manner as described at step 602 and can be mounted on the conveyor frame 104, as described at step 604. In this regard, according to some examples, the engagement member 402 of the conveyor frame can define multiple apertures like the aperture 404. Further, the engagement member 402 with multiple apertures can support the positioning of the multiple rollers (128, 202, and 204) within the respective apertures of the engagement member 402. The engagement member 402 herein, can correspond to that portion of the conveyor frame 104 that can be positioned between the first sidewall 108 and the side plate 112 of the conveyor frame 104. For instance, the engagement member can be a plate or metal sheet-like structure positioned at a defined spacing relative to the side plate 112 of the conveyor frame 104. In this regard, in some examples, each roller of the third set of rollers 126 can be positioned on the conveyor frame 104, so that a first portion of each roller is positioned beyond the second sidewall 110 of the conveyor frame 104 and within the defined spacing at which the engagement member 404 is positioned relative to the side plate 112. Said differently, each roller of the third set of rollers 126 can be positioned between the first sidewall 108 and the side plate 112 so that a first portion of the roller (e.g. the first portion 206 of the roller 128) can be positioned between the engagement member 402 and the side plate 112 and the second portion of the roller (e.g. the second portion 208 of the roller 128) is positioned between the first sidewall 108 and the engagement member 402, in a similar manner as described in reference to FIGS. 1-5.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A conveyor comprising:
   a conveyor frame comprising a sidewall;
   a roller mounted on the conveyor frame so that a first portion of the roller comprising a bearing assembly extends beyond the sidewall of the conveyor frame that guards a conveying surface of the conveyor; and
   a strip belt mounted over a second portion of the roller that is defined adjacent to the first portion on the roller, wherein the strip belt is positioned adjacent to the sidewall on the conveyor.

2. The conveyor of claim 1, wherein the conveyor frame comprises an engagement member that defines an aperture and configured to position the roller within the aperture.

3. The conveyor of claim 2, wherein the conveyor frame further comprises a side plate positioned at a defined spacing relative to the engagement member and wherein the first portion of the roller is positioned between the engagement member and the side plate.

4. The conveyor of claim 1, further comprising a plurality of rollers mounted on the conveyor frame, wherein an end of the roller is mounted on a side plate of the conveyor frame and respective ends of remaining rollers of the plurality of rollers are mounted on the sidewall of the conveyor frame.

5. The conveyor of claim 4, wherein the strip belt is mounted over the roller so that the strip belt is positioned proximal to the sidewall of the conveyor and distal to the side plate of the conveyor.

6. The conveyor of claim 5, wherein the strip belt corresponds to at least one of an O ring, a flat band, and a narrow band.

7. The conveyor of claim 1, wherein the second portion of the roller is a crowned portion of the roller and wherein the strip belt is mounted over a raised section of the crowned portion of the roller.

8. The conveyor of claim 7, wherein the crowned portion of the roller is a portion of the roller that is defined circumferentially around an axis of the roller with an increased diameter relative to a diameter of an uncrowned portion of the roller and wherein the crowned portion of the roller comprises a groove configured to support an O-ring and the strip belt over the O-ring.

9. The conveyor of claim 1, wherein the roller corresponds to a divert unit of the conveyor that is configured to divert an item from the conveyor to a divert section coupled to the divert unit of the conveyor.

10. A conveyor comprising:
a conveyor frame comprising a first sidewall, a second sidewall, and a side plate, wherein the first sidewall and the second sidewall guards a conveying surface of the conveyor;
a roller bed defined by a plurality of rollers comprising:
a roller comprising:
a first portion defined along a length of the roller, the first portion comprising a bearing assembly; and
a second portion defined adjacent to the first portion along the length of the roller, wherein the roller is mounted on the conveyor frame between the first sidewall and the side plate so that the second sidewall is positioned between the first portion and the second portion of the roller.

11. The conveyor of claim 10, wherein the conveyor frame further comprises an engagement member comprising an aperture, the engagement member configured to support positioning of the roller within the aperture.

12. The conveyor of claim 11, wherein the first portion of the roller is mounted on the conveyor frame so that the first portion extends beyond the second sidewall and positioned between the engagement member and the side plate of the conveyor frame and wherein the first portion of the roller comprises the bearing assembly configured to support rotation of the roller about an axis of the roller.

13. The conveyor of claim 10 further comprising:
a strip belt mounted over the second portion of the roller and positioned adjacent to second sidewall that guards the conveying surface of the conveyor.

14. The conveyor of claim 13, wherein the strip belt is mounted over the second portion of the roller so that the strip belt is positioned proximal to the second sidewall of the conveyor frame and distal to the side plate of the conveyor frame.

15. The conveyor of claim 13, wherein the strip belt is at least one of: an O ring, a flat band, and a narrow band.

16. The conveyor of claim 13 wherein the second portion of the roller corresponds to a crowned portion comprising an increased diameter relative to a diameter of uncrowned portion of the roller and wherein the strip belt is mounted over the crowned portion of the roller.

17. The conveyor of claim 10, wherein the roller corresponds to a set of rollers of a divert unit of the conveyor that is configured to divert an item from the conveyor to a divert section coupled to the divert unit of the conveyor.

18. A method of configuring roller bed of a conveyor comprising:
positioning, on an engagement member, a roller comprising a first portion and a second portion defined along a length of the roller, wherein the first portion of the roller comprises a bearing assembly that supports rotation of the roller; and
mounting the roller on a conveyor frame so that a sidewall that guards a conveying surface of the conveyor is positioned between the first portion and the second portion of the roller.

19. The method of claim 18 comprising:
engaging a first end of the roller to a first sidewall of the conveyor frame; and
engaging a second end of the roller to a side plate of the conveyor frame, wherein the first sidewall and the sidewall of the conveyor frame guards the conveying surface of the conveyor.

20. The method of claim 19, wherein a strip belt is mounted over the second portion and is at least one of; an O ring, a flat band, and a narrow band.

* * * * *